United States Patent
Fujimoto et al.

(10) Patent No.: US 12,304,170 B2
(45) Date of Patent: May 20, 2025

(54) RESIN COATED METAL SHEET AND CONTAINER

(71) Applicant: JFE STEEL CORPORATION, Tokyo (JP)

(72) Inventors: Soichi Fujimoto, Tokyo (JP); Tomonari Hiraguchi, Tokyo (JP); Yasuhide Oshima, Tokyo (JP); Yuya Kawai, Tokyo (JP); Katsumi Kojima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 516 days.

(21) Appl. No.: 17/627,045

(22) PCT Filed: Jul. 31, 2020

(86) PCT No.: PCT/JP2020/029411
§ 371 (c)(1),
(2) Date: Jan. 13, 2022

(87) PCT Pub. No.: WO2021/020556
PCT Pub. Date: Feb. 4, 2021

(65) Prior Publication Data
US 2022/0274378 A1 Sep. 1, 2022

(30) Foreign Application Priority Data
Jul. 31, 2019 (JP) ................. 2019-140454

(51) Int. Cl.
| | | |
|---|---|---|
| *B32B 15/09* | (2006.01) | |
| *B32B 1/00* | (2024.01) | |
| *B32B 7/022* | (2019.01) | |
| *B32B 15/18* | (2006.01) | |
| *B32B 15/20* | (2006.01) | |
| *B32B 27/36* | (2006.01) | |
| *B65D 25/34* | (2006.01) | |
| *B65D 65/40* | (2006.01) | |
| *B65D 65/42* | (2006.01) | |

(52) U.S. Cl.
CPC ............... *B32B 15/09* (2013.01); *B32B 1/00* (2013.01); *B32B 15/18* (2013.01); *B32B 27/36* (2013.01); *B65D 25/34* (2013.01); *B65D 65/40* (2013.01); *B32B 7/022* (2019.01); *B32B 15/20* (2013.01); *B32B 2250/02* (2013.01); *B32B 2270/00* (2013.01); *B32B 2307/514* (2013.01); *B32B 2307/54* (2013.01); *B32B 2307/732* (2013.01); *B32B 2439/40* (2013.01); *B32B 2439/66* (2013.01); *B32B 2439/70* (2013.01); *B65D 65/42* (2013.01); *Y10T 428/31681* (2015.04)

(58) Field of Classification Search
None
See application file for complete search history.

(56) References Cited

U.S. PATENT DOCUMENTS

| | | | |
|---|---|---|---|
| 2015/0210431 A1* | 7/2015 | Togo | B21D 22/201 72/46 |
| 2018/0029334 A1 | 2/2018 | Nakamura et al. | |
| 2021/0370655 A1* | 12/2021 | Fujimoto | B29C 48/08 |
| 2023/0032654 A1* | 2/2023 | Oshima | C09D 167/02 |

FOREIGN PATENT DOCUMENTS

| | | |
|---|---|---|
| JP | H05-331302 A | 12/1993 |
| JP | 2003-127277 A | 5/2003 |
| JP | 2005-254629 A | 9/2005 |
| JP | 2010-105263 A | 5/2010 |
| JP | 2017-213884 A | 12/2017 |
| JP | 2018-140542 A | 9/2018 |
| WO | 2016/159260 A1 | 10/2016 |

OTHER PUBLICATIONS

"The Free Dictionary—Compound" (https://www.thefreedictionary.com/compound) (webpage retrieved 30-OC-2024) (Year: 2024).*
Oct. 6, 2020 International Search Report issued in International Patent Application No. PCT/JP2020/029411.

* cited by examiner

*Primary Examiner* — Vivian Chen
(74) *Attorney, Agent, or Firm* — Oliff PLC

(57) ABSTRACT

A resin coated metal sheet includes: a metal sheet; and a resin layer configured to coat at least one face of the metal sheet. An indentation modulus of the resin layer on a side adhered to the metal sheet is 100 MPa to 300 MPa, and a melting point of the resin layer is 210° C. to 270° C.

8 Claims, No Drawings

RESIN COATED METAL SHEET AND CONTAINER

FIELD

The present invention relates to a resin coated metal sheet and a container.

BACKGROUND

Various kinds of thermosetting resins have conventionally widely been applied to an inner face and an outer face of metal containers formed of tin free steel (hereinafter, referred to as TFS), aluminum, or the like to coat the surface thereof for the purpose of corrosion prevention. However, the method of coating using thermosetting resin requires a long time for drying coatings, thus causing problems in that productivity degrades, a large amount of energy is consumed, and a large amount of solvent is discharged. Given these circumstances, to solve these problems, many methods laminating thermoplastic resin on a metal sheet to coat it have been developed. Examples of the method for laminating thermoplastic resin on the metal sheet to coat it include a method of heating the metal sheet subjected to various kinds of surface treatment such as plating treatment and thermally pressure bonding and laminating a thermoplastic resin film thereon.

Required for resin coated metal materials for container use are properties related to design such as appearance tone stability apart from basic properties such as workability, adhesion of coating resin, and corrosion resistance. In conventional metal sheets coated with polyester resin, during retort sterilization treatment, a phenomenon (hereinafter, referred to as retort whitening) in which the coating resin itself changes its color in a cloudy manner occurs. Retort whitening significantly impairs the design property of a container outer face and reduces consumer's purchase interest, and thus some improvement techniques are studied.

Specifically, as a method inhibiting retort whitening of resin coated metal sheets, Patent Literature 1 describes a method employing a resin composition containing a polyester resin having high crystallization rate. In this method, it is considered that many minute crystals are generated in a film during the retort sterilizing treatment, whereby retort whitening is inhibited. Patent Literature 2 describes a method performing heat treatment on a polyester resin coated metal sheet to control a crystal structure of a resin layer in a thickness direction. Furthermore, Patent Literature 3 describes a method performing heat treatment on a metal sheet coated with an unstretched polyester resin film to control a crystal structure of a resin layer in a thickness direction.

CITATION LIST

Patent Literature

Patent Literature 1: Japanese Patent Application Laid-open No. H05-331302
Patent Literature 2: Japanese Patent Application Laid-open No. 2010-105263
Patent Literature 3: Japanese Patent Application Laid-open No. 2017-213884

SUMMARY

Technical Problem

However, the method described in Patent Literature 1 has problems in that it is inferior in corrosion resistance to conventional polyester resins, and in addition, the coating resin is expensive. With the method described in Patent Literature 2, the crystallization of the polyester resin proceeds to a large extent, and high adhesion currently demanded cannot be obtained, although retort whitening can be inhibited. With the method described in Patent Literature 3, retort whitening cannot be sufficiently inhibited when the retort sterilization treatment is performed on harsh conditions such as high-temperature treatment and rapid cooling, which have been performed in recent years, although a balance between retort whitening and workability can be achieved.

The present invention has been made in view of the above problems. An object thereof is to provide a low-priced resin coated metal sheet having basic properties such as workability, adhesion of coating resin, and corrosion resistance and having retort whitening resistance in which a design property is not impaired even when subjected to retort sterilization treatment on harsh conditions and to provide a container.

Solution to Problem

A resin coated metal sheet according to the present invention includes: a metal sheet; and a resin layer configured to coat at least one face of the metal sheet, wherein an indentation modulus of the resin layer on a side adhered to the metal sheet is 100 MPa to 300 MPa, and a melting point of the resin layer is 210° C. to 270° C.

The at least one face of the metal sheet may be coated with the resin layer, and an indentation modulus of the resin layer on a side not adhered to the metal sheet may be 3,000 MPa to 5,000 MPa.

The resin layer may include a polyester resin as a main component.

The polyester resin may be a polyester resin mainly composed of an ethylene terephthalate unit and having a copolymerization amount of 15 mol % or less.

A container molded according to the present invention is formed of the resin coated metal sheet according to the present invention, and the resin layer is formed at least on an outer face side of the container.

Advantageous Effects of Invention

The present invention can provide a low-priced resin coated metal sheet having basic properties such as workability, adhesion of coating resin, and corrosion resistance and having retort whitening resistance in which a design property is not impaired even when subjected to retort sterilization treatment on harsh conditions and provide a container.

DESCRIPTION OF EMBODIMENTS

The following describes a resin coated metal sheet according to the present invention.

The resin coated metal sheet according to the present invention is characterized in that at least one face of a metal sheet is coated with a resin layer. Coating the metal sheet with the resin layer, when it is used as containers such as cans for food, for example, is preferred from the viewpoint of lubricant properties in can molding, corrosion resistance for inhibiting the degradation of the metal sheet, and a reduction in environmental load.

The resin coated metal sheet according to the present invention is characterized in that an indentation modulus of the resin layer with which at least one face is coated on a metal sheet adhering face side is 100 MPa or more and 300 MPa or less. The indentation modulus of the resin layer on the metal sheet adhering face side is more preferably 120 MPa or more and 280 MPa or less from the viewpoint of achieving both retort whitening resistance and adhesion with the metal sheet. The indentation modulus of the resin layer on the metal sheet adhering face side is even more preferably 140 MPa or more and 260 MPa or less and particularly preferably 150 MPa or more and 250 MPa or less.

When the indentation modulus of the resin layer on the metal sheet adhering face side is less than 100 MPa, water vapor during retort sterilization treatment is not necessarily completely blocked, and retort whitening may occur. On the other hand, when the indentation modulus of the resin layer on the metal sheet adhering face side is greater than 300 MPa, sufficient adhesion with the metal sheet is not necessarily obtained, and the resin layer may peel off during container molding or during the retort sterilization treatment. It is considered that the surface of the resin layer having flexibility is important for adhesion between the resin layer and the metal sheet. Making the indentation modulus of the resin layer on the metal sheet adhering face side within the above range can be achieved by subjecting a preferably crystallized film to thermal pressure bonding lamination on a specific condition and immediately thereafter performing heat treatment thereon on a specific condition as described below.

The following describes the mechanism of retort whitening. When a container formed of the resin coated metal sheet manufactured by the thermal pressure bonding lamination is subjected to the retort sterilization treatment, the resin layer with which an outer face side of the container is coated whitens. This is as follows: minute air bubbles are formed within the resin layer, light is scattered by the air bubbles, thus showing a cloudy appearance. In addition, the air bubbles formed in the resin layer have the following features. First, these air bubbles are not formed even though the container is heated in a dry heat environment. In addition, the air bubbles are not formed even though the retort sterilization treatment is performed with the container being empty without charging contents thereinto. The air bubbles are observed not across the entire area of an outer face side resin layer in a thickness direction and are observed near an interface being in contact with the metal sheet. From the foregoing features, it is considered that air bubble formation in the outer face resin layer along with the retort sterilization treatment occurs by the following mechanism.

The container is exposed to high-temperature water vapor from the start of the retort sterilization treatment, and part of the water vapor penetrates the outer face side resin layer to reach the vicinity of the interface with the metal sheet. In this process, the vicinity of the interface between the outer face resin layer and the metal sheet is cooled by the contents from an inner face side, and thus the water vapor having entered the interface becomes condensed water. Next, along with a lapse of time of the retort sterilization treatment, the temperature of the contents increases, and the condensed water at the interface with the metal sheet again vaporizes. The water vapor having vaporized passes through the resin layer again to escape to the outside; it is estimated that traces of the condensed water in this process become air bubbles. It is considered that the reason why the air bubbles are observed only near the interface with the metal sheet is not only that the place in which the condensed water is formed is the vicinity of the interface, but also that the resin near the interface has an amorphous structure having flexibility and thus easily becomes deformed and easily forms the air bubbles.

The reason why the resin near the interface has the amorphous structure is that the surface of the resin layer in contact with the metal sheet melts during the thermal pressure bonding lamination, and a crystal structure disappears.

The inventors of the present invention have studied measures based on the hypothesis of the mechanism of retort whitening described above. Consequently, it has been found that increasing the strength of the amorphous structure of the resin layer near the metal sheet interface, that is, facilitating crystallization can inhibit retort whitening and that crystallization proceeding to a large extent cannot gain sufficient adhesion with the metal sheet. Through further earnest study, it has been found that there is correlation between the crystal structure of the resin layer near the metal sheet interface, the resin layer being able to achieve both retort whitening resistance and adhesion with the metal sheet, and the indentation modulus of the resin layer on the metal sheet adhering face side. From the foregoing, the indentation modulus of the resin layer on the metal sheet adhering face side is made within the above range, whereby both the retort whitening resistance and the adhesion of the resin coated metal sheet can be achieved.

The resin coated metal sheet according to the present invention is characterized in that the melting point of the resin layer is 210° C. or more and 270° C. or less. When the resin layer is formed by mixing or laminating a plurality of resin compositions, a plurality of melting points may be observed in differential scanning calorimetry. In this case, all the melting points caused by the resins the melting enthalpy of which is 5 J/g or more are required to be within the above range. The melting point of the resin layer is more preferably 220° C. or more and 265° C. or less in view of being exposed to a high-temperature atmosphere during the retort sterilization treatment and from the viewpoint of achieving both corrosion resistance and workability. The melting point of the resin layer is even more preferably 230° C. or more and 260° C. or less and particularly preferably 240° C. or more and 255° C. or less.

When the melting point of the resin layer is less than 210° C., crystallinity may be insufficient, and retort whitening resistance may be poor, or corrosion resistance after high workability molding may be poor. On the other hand, when the melting point is more than 270° C., sufficient adhesion with the metal sheet is not necessarily obtained, and the resin layer may peel off during the container molding or during the retort sterilization treatment. Making the melting point of the resin layer within the above range can be achieved by a resin composition described below.

In the resin coated metal sheet according to the present invention, the indentation modulus of the resin layer with which at least one face is coated on a metal sheet non-adhering face side is preferably 3,000 MPa or more and 5,000 MPa or less. The indentation modulus of the resin layer on the metal sheet non-adhering face side is more preferably 3,200 MPa or more and 4,800 MPa or less from the viewpoint of achieving both retort whitening resistance and workability. The indentation modulus of the resin layer on the metal sheet non-adhering face side is even more preferably 3,400 MPa or more and 4,600 MPa or less and particularly preferably 3,600 MPa or more and 4,600 MPa or less.

When the indentation modulus of the resin layer on the metal sheet non-adhering face side is 3,000 MPa or more, retort whitening during the retort sterilization treatment can be inhibited more surely. On the other hand, when the indentation modulus of the resin layer on the metal sheet non-adhering face side is 5,000 MPa or less, more favorable workability is obtained, and thus corrosive degradation caused by cracks in the resin layer is hard to occur. Making the indentation modulus of the resin layer on the metal sheet adhering face side the above can be achieved by subjecting a preferably crystallized film to thermal pressure bonding lamination on a specific condition and immediately thereafter performing heat treatment thereon on a specific condition as described below.

In the resin coated metal sheet according to the present invention, the resin layer preferably has a polyester resin as a main component. The "main component" means that the proportion that a specific component occupies in the entire component is 80% by mass or more; the proportion is more preferably 85% by mass or more, even more preferably 90% by mass or more, and particularly preferably 95% by mass or more. The polyester resin is preferably a resin obtained by polymerization of monomers with an aromatic dicarboxylic acid or an aliphatic dicarboxylic acid and a diol as main components or a mixture of such resins.

Examples of the aromatic dicarboxylic acid include terephthalic acid, isophthalic acid, phthalic acid, naphthalene dicarboxylic acid, diphenyldicarboxylic acid, diphenylether dicarboxylic acid, diphenyl sulfone dicarboxylic acid, diphenoxyethane dicarboxylic acid, and 5-sodium sulfoisophthalic acid. Examples of the aliphatic dicarboxylic acid include oxalic acid, succinic acid, adipic acid, suberic acid, sebacic acid, dimer acid, maleic acid, fumaric acid, dodecanedioic acid, cyclohexanedicarboxylic acid, and ester derivatives of these. Only one kind of these acid components may be used, or two or more kinds may be used in combination. Furthermore, an oxycarboxylic acid such as p-oxybenzoic acid or the like may be copolymerized.

Examples of the diol component include ethylene glycol, propanediol, butanediol, pentanediol, hexanediol, neopentyl glycol, cyclohexane dimethanol, diethylene glycol, triethylene glycol, polyalkylene glycol, 2,2-bis(4-hydroxyethoxyphenyl)propane, isosorbide(1,4:3,6-dianhydroglucitol, 1,4:3,6-dianhydro-D-sorbitol), spiroglycol, bisphenol A, and bisphenol S. Among them, ethylene glycol and butanediol are preferably used. Only one kind of these diol components may be used, or two or more kinds may be used in combination.

As the polyester resin of the resin coated metal sheet according to the present invention, a polyester resin mainly composed of an ethylene terephthalate unit and having a copolymerization amount of 15 mol % or less is preferably used from the viewpoint of adhesion with the metal sheet. The polymerization amount is more preferably 10 mol % or less and even more preferably 5 mol % or less, and the copolymerization amount is particularly preferably 0 mol %, which means homo polyethylene terephthalate, which is non-copolymerized.

When the copolymerization amount to polyethylene terephthalate is 15 mol % or less, surer crystallinity is ensured, whereby more excellent retort whitening resistance and corrosion resistance after high workability molding can be provided while reducing the price of the resin lower.

The resin layer of the resin coated metal sheet according to the present invention may be copolymerized with a polyfunctional compound such as a trimellitic acid, trimesic acid, or trimethylol propane so long as the effects of the present invention are not impaired. Furthermore, for the purpose of imparting functions, resin components other than polyester may be added. Examples of the resin components include chain polyolefins such as polyethylene, polypropylene, poly(4-methylpentene-1), and polyacetal; alicyclic polyolefins as ring-opening metathesis polymers, addition polymers and addition copolymers with other olefins of norbornenes; biodegradable polymers such as polylactic acid and polybutyl succinate; polyamides such as nylon 6, nylon 11, nylon 12, and nylon 66; and aramid, polymethylmethacrylate, polyvinylchloride, polyvinylidene chloride, polyvinyl alcohol, polyvinyl butyral, ethylene-vinyl acetate copolymer, polyacetal, polyglycolic acid, polystyrene, styrene copolymerized polymethylmethacrylate, polycarbonate, polyethersulfone, polyetherether ketone, modified polyphenylene ether, polyphenylene sulfide, polyetherimide, polyimide, polyarylate, polytetrafluoroethylene resins, polytrifluoroethylene resins, polychlorotrifluoroethylene resins, polytetrafluoroethylene-polyhexafluoropropylene copolymer, and polyvinylidene fluoride. These resin components may be copolymers or mixtures.

A known antioxidant is preferably added to the resin forming the resin layer of the resin coated metal sheet according to the present invention in an amount of 0.0001% by mass or more and 1.0% by mass or less in view of improving heat resistance. The amount is more preferably 0.001% by mass or more and 1.0% by mass or less. As the type of the antioxidant, which is not limited to a particular type, known antioxidants classified into hindered phenols, hydrazines, and phosphites can be used, for example.

The resin forming the resin layer of the resin coated metal sheet according to the present invention may contain various additives such as lubricants, crystal nucleating agents, thermal stabilizers, antistatic agents, antiblocking agents, fillers, viscosity adjusting agents, and coloring pigments other than the antioxidants described above to the extent that the effects of the present invention are not impaired.

In the resin coated metal sheet according to the present invention, a resin layer thickness is preferably 10 μm or more and 30 μm or less. The resin layer thickness is more preferably 11 μm or more and 25 μm or less from the viewpoint of achieving both corrosion resistance and retort whitening resistance. The resin layer thickness is even more preferably 12 μm or more and 20 μm or less and particularly preferably 12 μm or more and 15 μm or less.

When the resin layer thickness is less than 10 μm, sufficient corrosion resistance is not necessarily obtained during high workability molding. On the other hand, when the resin layer thickness is greater than 30 μm, crystallization of the resin layer near the metal sheet interface by heat treatment may be hard to proceed, and retort whitening resistance may be poor.

As the resin layer of the resin coated metal sheet according to the present invention, a single-layer configuration of the same resin composition is preferably used, or a laminated configuration of two or more layers is also preferably used for the purpose of imparting functions. Various functions can be imparted including a surface layer to be laminated on the metal sheet with a composition having high adhesion with the metal sheet, a surface layer on the opposite side with a resin composition having excellent scratch resistance, and an inner layer with a composition imparting heat resistance and corrosion resistance, for example. Containing a lubricant only in the surface layer or containing a pigment only in the inner layer is a preferable method to contain additives without impairing the effects of the present invention. The lamination direction includes not only lamination in the thickness direction described above but also lamination in a longitudinal direction or a width direction; lamination in the thickness direction is preferred from the viewpoint of imparting functions as a resin layer for the coating of the metal sheet. The method of lamination may be any of coextrusion using a feed block system or a multi-manifold system, a method of bonding with another film, and lamination directly laminating melted resin onto a film, for example.

In the resin coated metal sheet according to the present invention, the resin layer is preferably formed by coating the metal sheet with a resin film formed of a thermoplastic resin by thermal pressure bonding. Examples of the method for coating the metal sheet with the resin layer include a method (thermal pressure bonding film lamination) heating the metal sheet up to a temperature greater than the melting point of the thermoplastic resin film and bringing the resin film into contact with its one face or both faces using a pressure bonding roll to thermally fusion bond it. This thermal pressure bonding film lamination is preferred in that it enables manufacture at a low price and with saved energy and that it can easily cause the resin film to have function imparting to the resin layer.

The following describes an example of a method for manufacturing the resin coated metal sheet according to the present invention, which is not necessarily limiting. When the resin coated metal sheet according to the present invention is manufactured, first, the preferred thermoplastic resin film described above to be the resin layer is manufactured. The thermoplastic resin is prepared in the form of pellets or the like; the pellets are dried in hot air or in a vacuum as needed and are then supplied to an extruder together with various additives. Within the extruder, the resin heated and melted at the melting point or more is unified in an extrusion amount by a gear pump or the like, from which foreign matter, modified resin, and the like are removed via a filter or the like. In the case of the laminated configuration, another resin is supplied to an extruder separate from the above, and they pass through different channels to be fed to a lamination apparatus. As the lamination apparatus, a feed block or a multi-manifold die can be used.

These resins are molded into sheet form by a T die and are then discharged. A melted sheet discharged from the T die is extruded onto a cooling body such as a casting drum and is then cooled and solidified to be obtained as an unstretched film. In this process, for the purpose of increasing adhesion between the cooling body such as the casting drum and the melted sheet, they are preferably brought into intimate contact with each other through electrostatic force to rapidly cool and solidify the melted sheet using an electrode of a wire shape, a tape shape, a needle shape, a knife shape, or the like. Also preferred are a method of blowing air from an apparatus of a slit shape, a spot shape, or a plane shape to bring them into intimate contact with each other to rapidly cool and solidify the melted sheet, a method of bringing them into contact with intimate contact with each other by nip rolls to rapidly cool and solidify the melted sheet, and a method of combining these methods.

The thus obtained unstretched film is preferably biaxially stretched in a vertical direction and a horizontal direction. Examples of the method of biaxial stretching include a sequential biaxial stretching method of giving stretching in a longitudinal direction followed by stretching in a width direction or giving stretching in the width direction followed by stretching in the longitudinal direction and a simultaneous biaxial stretching method of giving simultaneous stretching in the longitudinal direction and the width direction. In the case of the sequential biaxial stretching method, preferred is giving stretching in the longitudinal direction followed by stretching in the width direction from the viewpoint of making quality uniform and saving equipment space. The following describes the sequential biaxial stretching method of giving stretching in the longitudinal direction followed by stretching in the width direction.

First, the obtained unstretched film is stretched in the vertical direction. The stretching in the vertical direction means stretching to provide the unstretched film with molecular orientation in the longitudinal direction and is normally performed by a circumferential speed difference of rolls. The travel direction stretching may be performed in one stage or be performed in multiple stages using a plurality of roll pairs. The stretching ratio, which varies by the type of the resin, is preferably 2.0 times or more and 6.0 times or less. The stretching ratio is more preferably 2.5 times or more and 5.0 times or less and even more preferably 2.8 times or more and 4.5 times or less. When the vertical direction stretching ratio is less than 2.0 times, stretching variations may occur, and thickness variations in the longitudinal direction may increase in size. On the other hand, when the vertical direction stretching ratio is greater than 6.0 times, film breakage may occur during the stretching, or the subsequent horizontal stretching may become difficult, and film breakage may occur. The vertical direction stretching temperature is preferably the glass transition temperature of the resin forming the unstretched film or more and the glass transition temperature+100° C. or less. The vertical direction stretching temperature is more preferably the glass transition temperature+10° C. or more and the glass transition temperature+80° C. or less and even more preferably the glass transition temperature+30° C. or more and the glass transition temperature+70° C. or less. When the vertical direction stretching temperature is extremely low, the film may break during the stretching, or orientation in the longitudinal direction may be set to a large extent, and thermal contraction may easily occur. On the other hand, when the vertical direction stretching temperature is extremely high, the film may be thermally crystallized, and the film may break during the stretching or on the contrary soften to a large extent to adhere to the rolls.

The vertically stretched film is once slowly cooled and is then introduced to a tenter stretching machine with its film end gripped. The width direction stretching ratio is preferably 2.5 times or more and 10.0 times or less, more preferably 3.0 times or more and 8.0 times or less, and even more preferably 3.5 times or more and 6.0 times or less. When the width direction stretching ratio is less than 2.5 times, stretching variations may occur, and thickness variations in the width direction may increase in size. On the other hand, when the width direction stretching ratio is greater than 10.0 times, film breakage may occur during the stretching. The width direction stretching temperature is preferably the glass transition temperature of the resin forming the film or more and the glass transition temperature+100° C. or less and more preferably the glass transition temperature+30° C. or more and the glass transition temperature+100° C. or less. The width direction stretching temperature is even more preferably the glass transition temperature+35° C. or more and the glass transition temperature+90° C. or less and particularly preferably the glass transition temperature+40° C. or more and the glass transition temperature+80° C. or less.

When the width direction stretching temperature is extremely low, film breakage may occur during the stretching. On the other hand, when the width direction stretching temperature is extremely high, on the contrary orientation is not necessarily set, and thickness variations in the width direction may increase in size. The width direction stretched film is preferably then once thermally fixed from the viewpoint of easily imparting retort whitening resistance. The thermal fixing is preferably performed within the tenter heated at high temperature. The thermal fixing temperature is preferably the width direction stretching temperature or more and the meting point−50° C. or less and more preferably the width direction stretching temperature or more, the width direction stretching temperature+60° C. or less, and the meting point−50° C. or less. The thermal fixing temperature is even more preferably the width direction stretching temperature+10° C. or more, the width direction stretching temperature+50° C. or less, and the meting point −50° C. or less and particularly preferably the width direction stretching temperature+20° C. or more, the width direction stretching temperature+40° C. or less, and the meting point−50° C. or less. When the thermal fixing temperature is less than the width direction stretching temperature, thermal crystallization may be insufficient, and retort whitening resistance does not necessarily appear. On the other hand, when the thermal fixing temperature is higher than the meting point−50° C., the film may break by thermal contraction, or thermal crystallization may proceed to a large extent, sufficient adhesion with the metal sheet is not necessarily obtained, and the resin may peel off during the container molding or during the retort sterilization treatment.

Furthermore, the thermal fixing may be performed while relaxing the film in the longitudinal direction and/or the width direction. The relaxation rate is preferably 0.3% or more and 5.0% or less, more preferably 0.5% or more and 4.0% or less, and even more preferably 0.8% or more and 3.0% or less. The relaxation is performed simultaneously with the thermal fixing, whereby the residual stress of the biaxially oriented film is further reduced, which is preferred. When the relaxation rate is extremely low, the residual stress reduction effect is not necessarily obtained. On the other hand, when the relaxation rate is extremely high, the film does not necessarily completely contract, and the film may relax within the tenter. The thermally fixed film is then slowly cooled within the tenter to obtain a biaxially stretched film.

The following describes a method for coating the metal sheet with the resin film described above by the thermal pressure bonding film lamination. To achieve both retort whitening resistance and adhesion with the metal sheet in a heat treatment process after lamination, it is important to melt only a slight thickness part to be in contact with the metal sheet and to cause the resin film to adhere to the metal sheet. The following describes specific laminating conditions. The metal sheet surface temperature at the start of lamination is preferably the melting point of the thermoplastic resin film or more and the melting point+10° C. or less. The metal sheet surface temperature at the start of lamination is more preferably the melting point of the thermoplastic resin film+1° C. or more and the melting point+9° C. or less and even more preferably the melting point of the thermoplastic resin film+2° C. or more and the melting point+8° C. or less. When the metal sheet surface temperature at the start of lamination is less than the melting point of the thermoplastic resin film, adhesion with the metal sheet is not necessarily sufficiently obtained. On the other hand, when the metal sheet surface temperature is greater than the melting point of the resin film+10° C., the crystallization of an amorphous part present in the resin layer near the metal sheet interface does not necessarily sufficiently proceed, and retort whitening resistance does not necessarily appear even after passing through the subsequent heat treatment process. As a temperature history that the film undergoes during lamination, the time during which the resin film passes through the pressure bonding roll (that is, a thermal pressure bonding time) is preferably 10 msec or longer and 20 msec or shorter. The thermal pressure bonding time is more preferably 12 msec or longer and 19 msec or shorter and even more preferably 14 msec or longer and 18 msec or shorter. When the thermal pressure bonding time is shorter than 10 msec, adhesion with the metal sheet is not necessarily sufficiently obtained. On the other hand, when the thermal pressure bonding time is longer than 20 msec, the crystallization of the amorphous part present near the metal sheet interface does not necessarily sufficiently proceed, and retort whitening resistance does not necessarily appear even after passing through the subsequent heat treatment process. The pressurizing of the pressure bonding roll during lamination is preferably 3 kgf/cm$^2$ or more and 10 kgf/cm$^2$ or less as surface pressure. When the pressure bonding surface pressure is less than 3 kgf/cm$^2$, wrinkles or air bubbles may be mixed into the resin layer after lamination, or the pressure bonding time by the pressure bonding roll may be a short time, and sufficient adhesion is not necessarily obtained. On the other hand, when the pressure bonding surface pressure is greater than 10 kgf/cm$^2$, the pressure bonding time is prolonged, and the crystallization of the amorphous part near the metal sheet interface does not necessarily sufficiently proceed in the subsequent heat treatment process, and retort whitening resistance does not necessarily appear. The life of the pressure bonding roll may be shortened.

The reason why lamination at high temperature, for a long time, and at high pressure makes it difficult for the crystallization of the amorphous part near the metal sheet interface to proceed may be as follows.

Oriented crystals that the resin film originally has are exposed to high temperature for a long time and thereby sufficiently melt, change to what is called a random structure, and do not completely change to a crystal structure even when subjected to heat treatment. On the other hand, in the case of lamination within the preferable ranges, the oriented crystals of the resin film near the metal sheet interface melt while maintaining molecular chain regularity and thus become an amorphous structure having high molecular chain regularity what is called rigid amorphous. It is considered that owing to this rigid amorphous structure, sufficient crystallization proceeds in the subsequent heat treatment process.

Subsequently, the metal sheet laminated with the resin film is preferably then subjected to heat treatment to facilitate the crystallization of the amorphous part inevitably present in the resin layer near the metal sheet interface. As the method of heating, a method passing the metal sheet through a heating furnace such as induction heating (what is called IH), infrared rays (what is called IR), or an air-heating oven and a method passing the metal sheet through heating rolls continuously installed are preferably used. The amorphous part of the resin layer is present near the metal sheet interface, and thus IH and Ir, which can efficiently heat the metal sheet, are more preferred. In the case of IR, a heating furnace using near infrared rays, which has high transmittance through the resin layer and has high heating effect for the metal sheet, is particularly preferred. The heating temperature is preferably the crystallization temperature of the resin layer or more, the crystallization temperature+60° C. or less, and the melting point−30° C. and more preferably the crystallization temperature of the resin layer+10° C. or more, the crystallization temperature+55° C. or less, and the melting point–30° C. or less. The heating temperature is even more preferably the crystallization temperature of the resin layer+20° C. or more, the crystallization temperature+ 50° C. or less, and the melting point–30° C. or less and particularly preferably the crystallization temperature of the resin layer+25° C. or more, the crystallization temperature+ 45° C. or less, and the melting point–30° C. or less. When the heating temperature is less than the crystallization temperature of the resin layer, the crystallization of the amorphous part present near the metal sheet interface does not necessarily sufficiently proceed, and retort whitening resistance does not necessarily appear. On the other hand, when the heating temperature is greater than the crystallization temperature of the resin layer+60° C., the thermal crystallization of the resin layer may proceed to a large extent, sufficient adhesion with the metal sheet is not necessarily obtained, and workability may be poor. When the heating temperature is greater than the melting point of the resin layer –30° C., crystallization may be difficult to proceed, sites in which the crystal structure of the resin layer starts to melt may partially occur, and retort whitening resistance may be insufficient.

The heating rate of the metal sheet heat treatment after resin coating is preferably 50° C./second or more and 500° C./second or less and more preferably 60° C./second or more and 400° C./second or less. The heating rate is even more preferably 70° C./second or more and 350° C./second or less and particularly preferably 80° C./second or more and 300° C./second or less. When the heating rate is less than 50° C./second, the heating furnace is longer, which causes problems of equipment, and in addition, the metal sheet is slowly heated, whereby the crystallinity of the amorphous part near the metal sheet interface may excessively proceed, and adhesion with the metal sheet and workability may be poor. On the other hand, when the heating rate is higher than 500° C./second, it is difficult to control the heating rate, variations in the heating rate are likely to occur depending on a product position or manufacture timing, and products having poor performance may be produced.

The heating time of the metal sheet heat treatment after resin coating is preferably 1.0 second or longer and 8.0 seconds or shorter, more preferably 1.5 seconds or longer and 7.0 seconds or shorter, even more preferably 2.0 seconds or longer and 6.0 seconds or shorter, and particularly preferably 2.5 seconds or longer and 5.0 seconds or shorter. The heat treatment time refers to a time during which the metal sheet temperature reaches the heating temperature described above, the temperature is then kept, and the metal sheet leaves the heating furnace or the heating rolls. When the heating time is shorter than 1.0 second, the crystallization of the amorphous part present near the metal sheet interface does not necessarily sufficiently proceed, and retort whitening resistance does not necessarily appear. On the other hand, when the heating time is longer than 8.0 seconds, the crystallinity of the amorphous part near the metal sheet interface may excessively proceed, and adhesion with the metal sheet and workability may be poor.

The resin coated metal sheet having been subjected to the heat treatment is then immediately cooled. As the method for cooling the heated metal sheet, water cooling using temperature regulated water and gas cooling using air, nitrogen, helium, or the like are preferably used; water cooling is preferred from the viewpoint of simplifying equipment and being able to inhibit cooling variations of the metal sheet. As the method of water cooling, a method directly immersing the heated metal sheet in a water tank storing water and a method injecting water toward the metal sheet from a nozzle, a pipe, or the like are preferably used. The cooling temperature is preferably 5° C. or more and the glass transition temperature of the resin layer –10° C. or less and more preferably 10° C. or more and the glass transition temperature of the resin layer –15° C. or less. The cooling temperature is even more preferably 15° C. or more and the glass transition temperature of the resin layer –20° C. or less and particularly preferably 20° C. or more and the glass transition temperature of the resin layer –25° C. or less. When the cooling temperature is lower than 5° C., water may condense on the resin coated metal sheet after cooling or peripheral equipment, or it may be difficult to remove water having adhered to the resin coated metal sheet after cooling in the subsequent process. On the other hand, when the cooling temperature is higher than the glass transition temperature of the resin layer –10° C., the amorphous structure present within the resin layer may keep fluidity, and property variations may occur depending on a product position.

The cooling time of the heated metal sheet, which is not limited to a particular time, is preferably shorter from the viewpoint of simplifying equipment and energy saving; specifically, the cooling time is preferably 1.0 second or longer and 5.0 seconds or shorter. In the case of cooling by water cooling, water having adhered to the surface of the metal sheet is preferably squeezed by ringer rolls, or the surface is preferably dried by a blower or an oven.

For the metal sheet of the resin coated metal sheet according to the present invention, aluminum sheets, mild steel sheets, and the like, which are widely used as can materials, can be used. In particular, a surface treated steel sheet (TFS) formed with a two-layer film including metallic chromium as a lower layer and a chromium hydroxide as an upper layer or the like can suitably be used. The deposition amounts of the metallic chromium layer and the chromium hydroxide layer of the TFS are not limited to particular amounts. From the viewpoint of adhesion with the resin coating and corrosion resistance, the deposition amounts are preferably 70 mg/m$^2$ or more and 200 mg/m$^2$ or less for the metallic chromium layer and 10 mg/m$^2$ or more and 30 mg/m$^2$ or less for the chromium hydroxide layer in terms of Cr for both.

The resin coated metal sheet according to the present invention has basic properties such as workability, adhesion of coating resin, and corrosion resistance and has retort whitening resistance in which a design property is not impaired even when subjected to retort sterilization treatment on harsh conditions. Thus, the resin coated metal sheet according to the present invention can suitably be used for containers. In the resin coated metal sheet according to the present invention, a side of a container to be an outer face is preferably coated with the resin layer from the viewpoint of enabling retort whitening resistance to appear.

EXAMPLES

The following describes the present invention in detail with reference to examples. The properties were measured and evaluated by methods shown below.

(1) Pushing Elastic Modulus

The resin coated metal sheet is sheared into a sample size of 10 mm×10 mm and was then immersed in dilute hydrochloric acid to dissolve only the metal sheet and to isolate the resin layer. The indentation modulus was measured on the metal sheet adhering face side and the metal sheet non-adhering face side of the isolated resin layer. For the measurement, a high load unit of an ultra-micro pushing hardness tester ENT-NEXUS manufactured by Elionix Inc. conforming to ISO 14577-1/JIS 22255 was used. For the metal sheet adhering face of the resin layer, the measurement was performed under conditions with a stage temperature of 30° C., a pushing depth of 1,000 nm, and a maximum load holding time of 5,000 msec. For the metal sheet non-adhering face of the resin layer, the measurement was performed under conditions with a stage temperature of 30° C., a pushing depth of 200 nm, and a maximum load holding time of 1,000 msec. The measurement was performed five times for measurement sites selected at random, and an average was determined to be the indentation modulus of the sample. The measurement was performed with the measurement positions separated from each other by 15 µm or more.

(2) Thermal Properties (Melting Point, Crystallization Temperature, and Glass Transition Temperature) of Resin Layer The resin coated metal sheet was sheared into a sample size of 10 mm×10 mm and was then immersed in hydrochloric acid to dissolve only the metal sheet and to isolate the resin layer. The isolated resin layer in an amount of 5 mg was collected as a sample to an aluminum pan and was measured using a differential scanning calorimeter (DSCQ100) manufactured by TA Instruments. First, the temperature was lowered to −50° C. in a nitrogen atmosphere and was then raised up to 290° C. at 20° C./minute (1st Run). From a chart obtained in the 1st Run measurement, a peak temperature of a melting peak the melting enthalpy of which was 5 J/g or more was determined. The same measurement was performed three times, and an average thereof was determined to be a melting point. In the above measurement, the temperature was raised to 290° C., was then maintained for 5 minutes, and was then rapidly lowered with liquid nitrogen. Subsequently, the temperature was again raised from −50° C. up to 290° C. at 20° C./minute (2nd Run). From a chart obtained in the 2nd Run measurement, a crystallization temperature and a glass transition temperature were determined. The same measurement was performed three times, and respective averages thereof were determined to be the crystallization temperature and the glass transition temperature.

(3) Resin Layer Thickness

The resin coated metal sheet was sheared into a sample size of 50 mm×50 mm and was then immersed in hydrochloric acid to dissolve only the metal sheet and to isolate the resin layer. The thickness of the isolated resin layer was measured with a dial gauge 2110S-10 (a probe with an ultrahard ball) manufactured by Mitutoyo Corporation installed on a dial gauge stand 7001-10 manufactured by Mitutoyo Corporation. The measurement was performed 10 times for different places, and an average thereof was determined to be a resin layer thickness.

(4) Retort Whitening Resistance

Wax was applied to the resin coated metal sheet, and a blank with a diameter of 160 mm was punched to obtain a shallowly drawn can with a drawing ratio of 1.52. Next, this drawn can was subjected to redrawing with a drawing ratio of 1.26. Subsequently, the obtained redrawn can was subjected to trimming and was flanged to obtain a deeply drawn can. Tap water at normal temperature was charged into the inside of the obtained deeply drawn can, and then a lid was seamed to hermetically seal the deeply drawn can. Subsequently, retort sterilization treatment was performed under conditions of 130° C. and 90 minutes, and tap water at normal temperature was immediately charged into the inside of a retort tank to rapidly cool the deeply drawn can. Subsequently, an appearance change of an outer face of the can bottom was visually observed, and retort whitening resistance was evaluated on the following criteria.

A (Excellent): No appearance change
B (Good): Whitening recognizable on a closer observation
C (Failure): Whitening clearly recognizable (faulty appearance)

(5) Post-Molding Adhesion

Cross cutting was applied to a can barrel outer face of a deeply drawn can produced in the same manner as (4) across the entire can height. Subsequently, tap water at normal temperature was charged into the inside of the deeply drawn can, and then a lid was seamed to hermetically seal the deeply drawn can. Subsequently, retort sterilization treatment was performed on conditions of 130° C. and 90 minutes within a retort tank filled with tap water at normal temperature, and then the appearance of the can barrel outer face of the can having naturally been cooled to normal temperature was visually observed to evaluate post-molding adhesion on the following criteria.

A (Excellent): No film peeling
B (Good): Film peeling observed with a peeling length of less than 1 mm
C (Failure): Film peeling observed with a peeling length of 1 mm or more Example 1

As a raw material resin of a film, pellets of polyethylene terephthalate (PET) as a polyester resin were prepared and were sufficiently dried in a vacuum at high temperature so that water would not be contained. These pellets were charged into a monoaxial extruder and were melt kneaded at 280° C. Next, foreign matter was removed via a sintered filter with 25 µm cut, and then the melted resin was discharged from a T die and was cooled and fixed on a casting drum the surface temperature of which had been controlled to be 25° C. to obtain an unstretched film with a thickness of 200 µm. Next, the film was subjected to preliminary heating so as to give a film temperature of 110° C. using a heated ceramic roll and was subjected to 3.8 times stretching in the longitudinal direction of the film. Subsequently, with its end gripped by a clip, the film was introduced to a tenter stretching machine to be stretched in the width direction 5.0 times at 120° C. Left as it was, the film was subjected to 1.0% relaxation in the width direction while being thermally fixed at 140° C. Subsequently, slowly cooled to room temperature, the film with its end removed was wound by a winder to obtain a film for the coating of the metal sheet with a thickness of 12 µm.

Using TFS (metallic Cr layer: 120 mg/m² and Cr oxide layer: 10 mg/m² in terms of metallic Cr) with T3CA with a thickness of 0.22 mm as an original sheet as a metal sheet, a resin coated metal sheet was manufactured by the following thermal pressure bonding lamination. Specific laminating conditions included a metal sheet temperature immediately before lamination of 257° C., a time during which the resin film passes through the pressure bonding roll of 14 msec, and a pressure bonding roll surface pressure of 3 kgf/cm². For a temperature during lamination, a temperature before lamination was measured with a radiation thermometer (a position of 100 mm from a nip position). Subsequently, after a lapse of 1 second from thermal pressure bonding, the metal sheet was water cooled, after which water droplets on the surface were once removed, and was then subjected to heat treatment to facilitate the crystallization of the amorphous part inevitably present in the resin layer near the metal sheet interface. The heat treatment was performed by passing the metal sheet through an IH heating furnace, with a heating temperature of 162° C., a heating rate of 80° C./second, and a heating time of 5 seconds. After leaving the heating furnace, the heated metal sheet was directly immersed in water tank storing 30° C. water for 3 seconds to be cooled, and then water droplets on the surface were removed once again to obtain a resin coated metal sheet with both faces of the metal sheet coated with a resin coating layer. Table 1 lists the properties of the obtained resin coated metal sheet.

Example 2

Produced in the same manner as Example 1 except that the thermal fixing temperature during the film manufacture was set at 138° C., a resin coated metal sheet was obtained. Table 1 lists the properties of the obtained resin coated metal sheet.

Example 3

Produced in the same manner as Example 1 except that the metal sheet temperature immediately before lamination during the resin film lamination was set at 264° C., a resin coated metal sheet was obtained. Table 1 lists the properties of the obtained resin coated metal sheet.

(Example 4)

Produced in the same manner as Example 1 except that the time during which the resin film passes through the pressure bonding roll during the resin film lamination was set at 19 msec, a resin coated metal sheet was obtained. Table 1 lists the properties of the obtained resin coated metal sheet.

Example 5

Produced in the same manner as Example 1 except that the heating temperature during the metal sheet heat treatment was set at 183° C., a resin coated metal sheet was obtained. Table 1 lists the properties of the obtained resin coated metal sheet.

Example 6

Produced in the same manner as Example 1 except that the heating rate during the metal sheet heat treatment was set at 70° C./second, a resin coated metal sheet was obtained. Table 1 lists the properties of the obtained resin coated metal sheet.

Example 7

Produced in the same manner as Example 1 except that the heating time during the metal sheet heat treatment was set at 6.0 seconds, a resin coated metal sheet was obtained. Table 1 lists the properties of the obtained resin coated metal sheet.

Example 8

As raw material resins of a film, pellets of polybutylene terephthalate (PBT) and polyethylene terephthalate (PET) copolymerized with 5 mol % of isophthalic acid as polyester resins were prepared. They were each sufficiently dried in a vacuum at high temperature so that water would not be contained. Subsequently, the pellets were blended to give 40% by mass of PBT and 60% by mass of PET, were charged into a monoaxial extruder, and were melt kneaded at 270° C. Next, foreign matter was removed via a sintered filter with 25 µm cut, then the melted resin was discharged from a T die and was cooled and fixed on a casting drum the surface temperature of which had been controlled to be 35° C. to obtain an unstretched film with a thickness of 200 µm. Next, the film was subjected to preliminary heating so as to give a film temperature of 85° C. using a heated ceramic roll and was subjected to 3.8 times stretching in the longitudinal direction of the film. Subsequently, with its end gripped by a clip, the film was introduced to a tenter stretching machine to be stretched in the width direction 5.0 times at 95° C. Left as it was, the film was subjected to 1.0% relaxation in the width direction while being thermally fixed at 120° C. Subsequently, slowly cooled to room temperature, the film with its end removed was wound by a winder to obtain a film for the coating of the metal sheet with a thickness of 12 µm.

Using TFS (metallic Cr layer: 120 mg/m$^2$ and Cr oxide layer: 10 mg/m$^2$ in terms of metallic Cr) with T3CA with a thickness of 0.22 mm as an original sheet as a metal sheet, a resin coated metal sheet was manufactured by the following thermal pressure bonding lamination. Specific laminating conditions included a metal sheet temperature immediately before lamination of 242° C., a time during which the resin film passes through the pressure bonding roll of 14 msec, and a pressure bonding roll surface pressure of 3 kgf/cm$^2$. For a temperature during lamination, a temperature before lamination was measured with a radiation thermometer (a position of 100 mm from a nip position). Subsequently, after a lapse of 1 second from thermal pressure bonding, the metal sheet was water cooled, after which water droplets on the surface were once removed, and was then subjected to heat treatment to facilitate the crystallization of the amorphous part inevitably present in the resin layer near the metal sheet interface. The heat treatment was performed by passing the metal sheet through an IH heating furnace, with a heating temperature of 120° C., a heating rate of 80° C./second, and a heating time of 5 seconds. After leaving the heating furnace, the heated metal sheet was directly immersed in water tank storing 30° C. water for 3 seconds to be cooled, and then water droplets on the surface were removed once again to obtain a resin coated metal sheet with both faces of the metal sheet coated with a resin coating layer. Table 1 lists the properties of the obtained resin coated metal sheet.

Example 9

Produced in the same manner as Example 1 except that the extrusion amount of the melted resin was adjusted to give a film thickness of 30 µm, a resin coated metal sheet was obtained. Table 1 lists the properties of the obtained resin coated metal sheet.

Example 10

Produced in the same manner as Example 1 except that a film was produced using a PET copolymerized with 16 mol % of isophthalic acid as a raw material resin of the film, the metal sheet temperature immediately before lamination during the resin film lamination was set at 217° C., and the heating temperature during the metal sheet heating treatment was set at 175° C., a resin coated metal sheet was obtained. Table 1 lists the properties of the obtained resin coated metal sheet.

Comparative Example 1

Produced in the same manner as Example 1 except that the metal sheet heat treatment was not performed, a resin coated metal sheet was obtained. Table 1 lists the properties of the obtained resin coated metal sheet.

Comparative Example 2

Produced in the same manner as Example 1 except that the thermal fixing temperature during the film manufacture was set at 205° C., a resin coated metal sheet was obtained. Table 1 lists the properties of the obtained resin coated metal sheet.

Comparative Example 3

Produced in the same manner as Example 1 except that the heating time during the metal sheet heat treatment was set at 9.0 seconds, a resin coated metal sheet was obtained. Table 1 lists the properties of the obtained resin coated metal sheet.

Comparative Example 4

Produced in the same manner as Example 1 except that the heating temperature during the metal sheet heat treatment was set at 135° C., a resin coated metal sheet was obtained. Table 1 lists the properties of the obtained resin coated metal sheet.

Comparative Example 5

Produced in the same manner as Example 1 except that a film was produced using a PET copolymerized with 18 mol % of isophthalic acid as a raw material resin of the film, the metal sheet temperature immediately before lamination during the resin film lamination was set at 210° C., and the heating temperature during the metal sheet heat treatment was set at 177° C., a resin coated metal sheet was obtained. Table 1 lists the properties of the obtained resin coated metal sheet.

Comparative Example 6

Produced in the same manner as Example 1 except that the extrusion amount of the melted resin was adjusted to produce an unstretched film with a thickness of 12 μm, and without performing the subsequent stretching, the film with its end removed was wound by a winder to obtain a film for the coating of the metal sheet, a resin coated metal sheet was obtained. Table 1 lists the properties of the obtained resin coated metal sheet.

[Evaluation]

Table 1 collectively lists evaluation results of retort whitening resistance and post-molding adhesion of Examples 1 to 10 and Comparative Examples 1 to 6. As listed in Table 1, in Comparative Example 1 to 6, at least one of retort whitening resistance and post-molding adhesion was the C (failure) evaluation. On the other hand, in Examples 1 to 10, both retort whitening resistance and post-molding adhesion were the B (good) evaluation or higher.

TABLE 1

| | | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|---|---|---|
| Pushing elastic modulus of resin, layer on metal sheet adhering face side | MPa | 215 | 148 | 121 | 128 | 257 | 260 | 258 | 105 | 151 | 118 | 25 | 350 | 323 | 55 | 101 | 93 |
| Pushing elastic modulus of resin, layer on metal sheet non-adhering face side | MPa | 3820 | 3530 | 3250 | 3310 | 4560 | 4580 | 4600 | 3080 | 2990 | 3190 | 3180 | 5210 | 5120 | 3280 | 3100 | 86 |
| Resin layer melting point | °C. | 255 | 255 | 255 | 255 | 255 | 255 | 255 | 210, 240 | 255 | 215 | 255 | 255 | 255 | 255 | 208 | 253 |
| Resin layer glass transition temperature | °C. | 79 | 9 | 9 | 9 | 79 | 9 | 79 | 55 | 9 | 8 | 9 | 9 | 79 | 9 | 8 | 9 |
| Resin layer crystallization temperature | °C. | 137 | 137 | 137 | 137 | 137 | 137 | 137 | 95 | 137 | 150 | 137 | 137 | 137 | 137 | 152 | 137 |
| Resin layer thickness | μM | 12 | 12 | 12 | 12 | 12 | 12 | 12 | 12 | 0 | 12 | 12 | 12 | 12 | 12 | 12 | 12 |
| Resin layer main component composition | — | PET | PET | PET | PET | PET | PET | PET | PET + PET | PET | PET | PET | PET | PET | PET | PET | PET |
| Copolymerized component in resin layer main component | — | — | — | — | — | — | — | — | isophthalic acid | — | isophthalic acid | — | — | — | — | — | isophthalic acid |
| Resin layer main component copolymerization amount | mol % | 0 | 0 | 0 | 0 | 0 | 0 | 0 | 5 | 0 | 16 | 0 | 0 | 0 | 0 | 18 | 0 |
| Retort whitening resistance | | A | B | B | B | A | A | A | B | B | B | C | C | A | C | C | C |
| Post-molding adhesion | | A | A | A | A | B | B | B | A | A | A | A | C | C | A | A | A |

INDUSTRIAL APPLICABILITY

The present invention can provide a low-priced resin coated metal sheet having basic properties such as workability, adhesion of coating resin, and corrosion resistance and having retort whitening resistance in which a design property is not impaired even when subjected to retort sterilization treatment on harsh conditions and provide a container.

Reference Signs List.

The invention claimed is:

1. A resin coated metal sheet comprising:
   a metal sheet; and
   a resin layer in direct contact with the metal sheet and configured to coat at least one face of the metal sheet,
   wherein an indentation modulus of the resin layer on a side adhered to the metal sheet is 100 MPa to 300 MPa, and a melting point of the resin layer is 210° C. to 270° C.,
   wherein the resin layer contains a polyester resin, wherein: (i) the polyester resin is one of: polyethylene terephthalate; and polyethylene terephthalate copolymerized with 16 mol % or less of isophthalic acid; and (ii) the polyester resin constitutes 95% by mass or more of the resin layer.

2. The resin coated metal sheet according to claim 1, wherein the at least one face of the metal sheet is coated with the resin layer, and an indentation modulus of the resin layer on a side not adhered to the metal sheet is 3,000 MPa to 5,000 MPa.

3. The resin coated metal sheet according to claim 2, wherein a raw material resin of the resin layer is polyethylene terephthalate copolymerized with 15 mol % or less of isophthalic acid.

4. A container formed of the resin coated metal sheet according to claim 1, wherein the resin layer is formed at least on an outer face side of the container.

5. The container according to claim 4, wherein the at least one face of the metal sheet is coated with the resin layer, and an indentation modulus of the resin layer on a side not adhered to the metal sheet is 3,000 MPa to 5,000 MPa.

6. The container according to claim 5, wherein a raw material resin of the resin layer is polyethylene terephthalate copolymerized with 15 mol % or less of isophthalic acid.

7. The container according to claim 4, wherein a raw material resin of the resin layer is polyethylene terephthalate copolymerized with 15 mol % or less of isophthalic acid.

8. The resin coated metal sheet according to claim 1, wherein a raw material resin of the resin layer is polyethylene terephthalate copolymerized with 15 mol % or less of isophthalic acid.

* * * * *